(12) United States Patent
Aoki

(10) Patent No.: US 6,628,427 B1
(45) Date of Patent: Sep. 30, 2003

(54) METHOD AND APPARATUS FOR IMAGE PROCESSING WHICH IMPROVES PERFORMANCE OF GRAY SCALE IMAGE TRANSFORMATION

(75) Inventor: Shin Aoki, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/348,451

(22) Filed: Jul. 7, 1999

(30) Foreign Application Priority Data

Jul. 7, 1998 (JP) .......................................... 10-191277

(51) Int. Cl.[7] ................................................ G06K 9/32
(52) U.S. Cl. ...................................... 358/3.09; 358/461
(58) Field of Search ............................... 358/3.09–3.12, 358/3.07, 1.9, 461; 382/237

(56) References Cited

U.S. PATENT DOCUMENTS

| | | | |
|---|---|---|---|
| 5,226,096 A | * 7/1993 | Fan | 382/237 |
| 5,311,328 A | * 5/1994 | Murata | 358/447 |
| 6,360,029 B1 | * 3/2002 | Moller | 382/298 |

FOREIGN PATENT DOCUMENTS

| | | |
|---|---|---|
| JP | 62-239667 | 10/1987 |
| JP | 11-27528 | 1/1999 |

* cited by examiner

*Primary Examiner*—Thomas D. Lee
*Assistant Examiner*—Stephen Brinich
(74) *Attorney, Agent, or Firm*—Greenberg Traurig, LLP; Eugene C. Rzucidlo; Joseph M. Manak

(57) ABSTRACT

An image processing method includes inputting pixels into an input image data buffer. Each input pixel has an original value equal to one of n values representing n density levels. A first transforming step includes a defining step and a determining step. The defining step defines a pixel set including a plurality of non-processed pixels located adjacent to each other in a processed-pixel recording buffer. The determining step determines output pixel values from m values. Each of the output pixel values determined by the determining step is assigned to each non-processed pixel. A second transforming step transforms each of the input pixels to a transformed pixel which has an output pixel value equal to one of m values representing m density levels according to an error diffusion method. A selecting step selects one of resultant values produced by the first and second transforming steps in accordance with an original value of an input pixel currently being processed.

19 Claims, 10 Drawing Sheets

G: A BLACK PIXEL LOCATION HAVING A RELATIVELY SMALL ERROR VALUE

H: PIXELS WHICH ARE NOT PRONE TO BE DETERMINED AS BLACK PIXELS BY ERROR DIFFUSION

I: NON-PROCESSED PIXELS

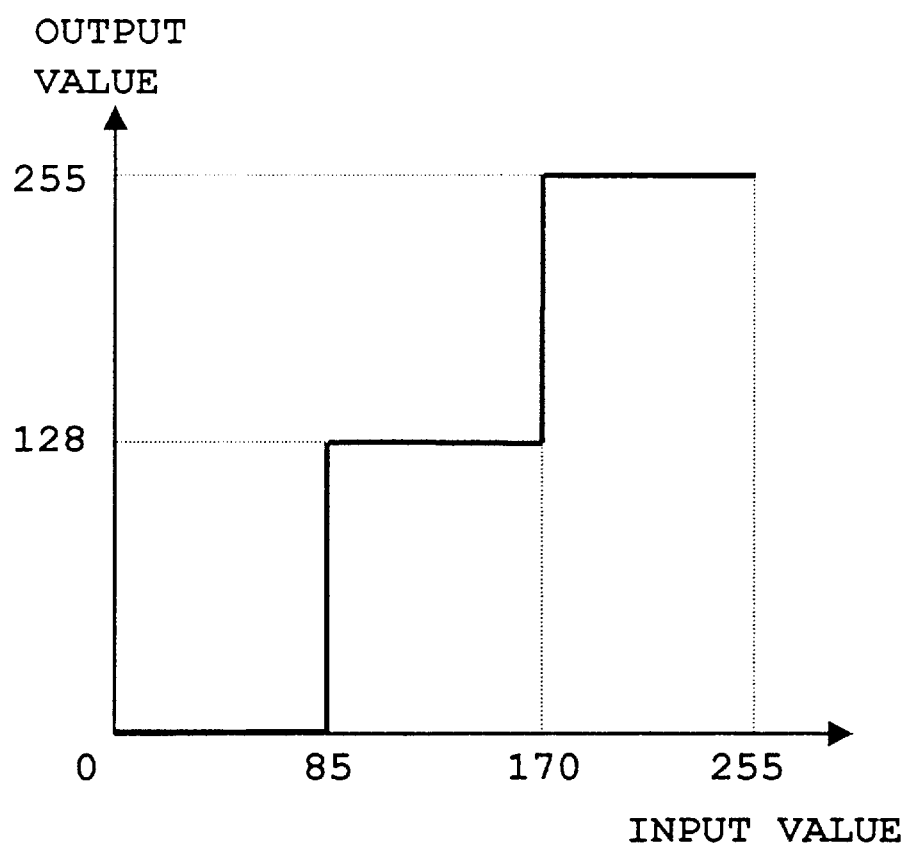

FIG. 12A

| 1 | 3 | 1 |
|---|---|---|
| 3 | X |   |

X: OBJECT PIXEL

FIG. 12B

| 1 | 3 | 5 | 3 | 1 |
|---|---|---|---|---|
| 3 | 5 | 7 | 5 | 3 |
| 5 | 7 | X |   |   |

X: OBJECT PIXEL

METHOD AND APPARATUS FOR IMAGE PROCESSING WHICH IMPROVES PERFORMANCE OF GRAY SCALE IMAGE TRANSFORMATION

BACKGROUND OF THE INVENTION

1. Field of the Invention

This invention relates to a method and apparatus for image processing, and more particularly to a method and apparatus for image processing which improves the performance of gray scale image transformation.

2. Discussion of the Background

A variety of techniques for representing a continuous tone image in a binary format, also known as halftoning, have been developed. Known halftoning techniques include a dithering method and an error diffusion method, each of which represents each pixel of a continuous tone image with one dot. The dithering method uses a threshold matrix and processing occurs by comparing one threshold value to an adjacent threshold value in the matrix so as to create a repetition characteristic which depends on threshold existence in matrix. The repetition characteristic causes the Moire phenomenon to occur when using the dithering process.

Error diffusion is more preferable as compared to the dithering method because the error-diffusion method is not influenced by the repetition characteristic of the threshold matrix because the error diffusion method do not use a threshold matrix in the binarization process. Error diffusion has the advantages of better resolution and non-repeatable data appearance compared to the dithering method.

However, the error diffusion method has problems in that the dots representing an image are not distributed uniformly to produce a clear image. Instead, the dots appear to be arranged in lines rather than uniformly distributed and therefore, the dots are viewed as noise and the dots are clearly visible as a result of the error diffusion process.

FIG. 1 illustrates a block diagram of a general error diffusion circuit for explaining a principle of the error diffusion method. This error diffusion circuit of FIG. 1 is characterized by the method of error determination. More specifically, an error $e(m, n)$ of an input pixel $f(m, n)$ is determined using a subtracter 113 which is configured to subtract a pixel $g(m, n)$ from a pixel $cf(m, n)$, wherein the pixel $cf(m, n)$ is input to the threshold processing circuit 112 and the pixel $g(m, n)$ is output from the threshold processing circuit 112.

In the error diffusion circuit of FIG. 1, an adder 111 receives an original input pixel $f(m, n)$ from an input source and an error factor from a product/addition circuit 114. An error weighting mask 115 having a coefficient "a" assigns a weight to an error value $e(m-k, n-l)$ which has been generated during the processing of a pixel $(m-k, n-l)$, wherein the pixel $(m-k, n-l)$ proceeds to the pixel $f(m, n)$ for the number of pixels $(k, l)$. The weighted error value $e(m-k, n-l)$ is sent to the product/addition circuit 114 and then to the adder 111 as an error factor. The adder 111 adds the weighted error value $e(m-k, n-l)$ to the pixel $f(m, n)$ to obtain a corrected value $cf(m, n)$ which is then sent to a threshold processing circuit 112 for outputting a pixel $g(m, n)$. Then, a subtracter 113 generates an error $(m, n)$ using an equation $e(m, n)=cf(m, n)-g(m, n)$.

The above-described error diffusion method has advantages in the aspects of non-periodicity of image and a feature of adaptive modulation.. However, such an error diffusion method also has disadvantages in that a relationship between two adjacent dots are not considered and compensated for, which causes generation of periodic texture such that dots are actually visible to the human eye and causes non-uniform distribution of dots.

The method and apparatus shown in FIG. 1 does not include any means for correcting the problem of unpredictable, non-uniform distribution of dots also referred to as "periodic texture".

Japanese Laid-Open Patent Publication No. JPAP62-239667 describes a method for image processing which eliminates the above-mentioned disadvantages of the error diffusion. In principle, this method varies the threshold value in a periodic manner so as to arrange dots such that the dots appear to have been made through a mesh screen. However, this method causes generation of moire fringes and deterioration of image quality by causing a reduction of resolution, similar to dithering.

Another method which is related to the present invention described and claimed hereinbelow and which related method has not been publicly disclosed prior to the filing date of the priority application of the present application,. is referred to as an adaptive cell method. The adaptive cell method is disclosed in Laid-Open Japanese Patent Application 11-27528 published on Jan. 29, 1999.

In the adaptive cell method, the relationship between adjacent dots is considered and compensated. More specifically, in this method, a dot is put into the center of a cell or matrix consisting of a number of pixels. This method determines a cell size in accordance with the sum total of input pixel values and arranges each dot at the center of each cell. This method realizes a gray-scale-like transformation which does not generate factitiously-connected dots that deteriorate image quality, while maintaining a gray image having a relatively high resolution, as with the error diffusion, as a result of its advantageous features such as the non-periodicity of the image and the adaptive modulation.

One superior feature of the adaptive cell method is a better circularity of dots. That is, dots are arranged in an approximately even manner in a highlight portion of a gray image. This feature appears particularly around a highlight portion of a gray image, wherein a highlight portion is defined as an image which has been transformed so that a relatively small number of pixels among all of the pixel's resulting from the binary transformation turn to black or to an ON state.

However, the adaptive cell method has the following drawbacks. One drawback is that a dot of a cell may be inconsistently connected to (D1 and D2 in FIG. 2A) or spaced apart from (E in FIG. 2A) a dot of an adjacent cell in a middle portion (an area where the numbers of black (A in FIG. 2A) and white (B in FIG. 2A) pixels are nearly equal) of an image. As shown in FIG. 2A which illustrates an exemplary bad result of the processing on an image using a three-pixel cell (indicated by a letter C) according to the adaptive cell method, this phenomenon appears particularly when the cell size becomes relatively small (i.e., 3). The reason for the occurrence of this phenomenon is that the adaptive cell method determines the connection of adjacent dots and a location of dot in a cell regardless of dot locations in the surrounding cells.

Another drawback is shown in FIG. 2B where an exemplary bad result of the processing on an image using a 20-pixel cell (indicated by a letter C) according to the adaptive cell method. In this case, 9 black pixels (indicated by a letter F) in the center of the cell form a dot. When a minimum cell size is limited, a plurality of adjacent pixels are determined as a dot. Accordingly, lower-resolution output devices (i.e., a laser printer) may produce an image with relatively large-sized dots. Such an image typically produces an inferior circularity of dots. As seen in FIG. 2b, the dot is so big that the image resolution is decreased even though FIG. 2b is improved relative to FIG. 2a since the large white area in the central portion present in FIG. 2a is avoided in FIG. 2b.

Also, when a minimum cell size is limited, a problem of lower resolution arises since a cell has a relatively large dot therein and density variations cannot be smaller than the cell.

SUMMARY OF THE INVENTION

The present application provides a method for image processing which can overcome the problems and disadvantages described above while greatly improving the quality and performance of gray scale image transformation.

More specifically, the present application provides a novel method and apparatus for performing error diffusion using a unique adaptive cell error diffusion method which transforms n-step gray tone digital image data into m-step gray tone digital image data, wherein n and m are positive whole numbers and n is greater than m.

In one preferred embodiment, a method includes the steps of inputting into an input image data buffer, n-step gray tone digital image data which includes a plurality of input pixels. Each input pixel has an original value which is one of n values representing n density levels. A first transforming step transforms each of the input pixels stored in the input image data buffer into a transformed pixel which has an output pixel value which is equal to one of m values representing m density levels. The first transforming step includes a defining step and a determining step. The defining step defines a pixel set which includes a plurality of non-processed pixels which are located adjacent each other in a processed-pixel recording buffer in accordance with a sum total of the original values of input pixels stored in the input image data buffer at locations corresponding to the plurality of non-processed pixels to be defined as a pixel set. The determining step determines output pixel values from the m values in accordance with a sum total of the original values of input pixels stored in the in put image data buffer at locations corresponding to a plurality of non-processed pixels of the pixel set defined by the defining step. Each of the output pixel values determined by the determining step is assigned to each non-processed pixel included in the pixel set defined by the defining step in a predetermined manner. A second transforming step transforms each of the input pixels stored in the input image data buffer to a transformed pixel which has an output pixel value selected from the m values representing m density levels according to an error diffusion method. Then, a selecting step selects one of a plurality of resultant values of the first and second transforming steps in accordance with an original value of a currently processed input pixel included in the input pixels stored in the input image data buffer.

The selecting step may select the resultant value of the second transforming step when the sum total of the original values of pixels stored in the input image data buffer at the locations corresponding to the plurality of non-processed pixels included in the pixel set defined in the defining step is within a first predetermined range.

Also, the selecting step may select the resultant value of the first transforming step when the original value of the currently processed input pixel included in the input pixels stored in the input image data buffer is within a second predetermined range.

Preferably, the first transforming step includes a correction step for correcting the original value of the currently processed input pixel with error values relating to adjacent pixels located around the currently processed input pixel, and the second transforming step includes a calculation step for calculating a difference between the resultant value of the first transforming step and the original value corrected by the correction step when the selecting step selects the resultant value of the first transforming step and records the difference as an error.

Further, the second transforming step may shift the currently processed input pixel to different pixel according to whether the currently processed input pixel has been assigned an output pixel value, and may perform a product and addition operation relative to the different pixel.

Still further, the second transforming step may change an error weighting mask currently being used to a different mask depending on whether the currently processed input pixel has been assigned an output pixel value, and may perform a product and. addition operation using the different mask.

Preferred embodiments of the present application also provide a storage media which stores a computer program therein for performing image processing to transform n-step gray tone digital image data to m-step gray tone digital image data, wherein n and m are positive whole numbers and n is greater than m. In one preferred embodiment of the apparatus, a storage media includes a computer program which causes a processor to perform the steps of inputting, first transforming, second transforming, and selecting. The inputting step inputs into an input image data buffer, n-step gray tone digital image data which includes a plurality of input pixels. Each input pixel has an original value which is one of n values representing n density levels. The first transforming step transforms each of the input pixels stored in the input image data buffer into a transformed pixel -which has an. output pixel value which is equal to one of m values representing m density levels. The first transforming step includes a defining step for defining a pixel set including a plurality of non-processed pixels located adjacent to each other in a processed-pixel recording buffer in accordance with a sum total of the original values of input pixels stored in the input image data buffer at locations corresponding to the plurality of non-processed pixels to be defined as a pixel set. The first transforming step further includes a determining step for determining output pixel values from the m values,in accordance with a sum total of the original values of input pixels stored in the input image data buffer at locations corresponding to a plurality of non-processed pixels of the pixel set defined by the defining step. Each of the output pixel values determined by the determining step is, assigned to each non-processed pixel included in the pixel set defined by the defining step in a predetermined manner. The second transforming step transforms each of the input pixels stored in the input image data buffer into a transformed pixel which has an output pixel value which is one of the m values representing m density levels according to an error diffusion method. The selecting step selects one of the resultant values of the first and second transforming steps in accordance with an original value of a currently processed input pixel included in the input pixels stored in the input image data buffer.

Preferred embodiments of the present application further provide an image processing apparatus for image processing which transforms n-step gray tone digital image data to m-step gray tone digital image data, wherein n and m are positive whole numbers and n is greater than m. In a preferred embodiment of this apparatus, an image processing apparatus includes an input mechanism, a first transforming mechanism, a second transforming mechanism, and a selecting mechanism. The input mechanism inputs into an input image data buffer, n-step gray tone digital image data including a plurality of input pixels. Each input pixel has an original value which is equal to one of n values representing n density levels. The first transforming mechanism transforms each of the input pixels stored in the input image data buffer into a transformed pixel which has an output pixel value which is equal to one of m values representing m density levels.

The first transforming mechanism includes a defining mechanism which defines a. pixel set including a plurality of non-processed pixels which are located adjacent to each other in a processed-pixel recording buffer in accordance with a sum total of the original values of input pixels stored in the input image data buffer at locations corresponding to the plurality of non-processed pixels to be defined as a pixel set. The first transforming mechanism further includes a determining mechanism which determines output pixel values from the m values in accordance with a sum total of the original values of input pixels stored in the input image data buffer at locations corresponding to a plurality of non-processed pixels of the pixel set defined by the defining mechanism. Each of the output pixel values determined by the determining mechanism is assigned to each non-processed pixel included in the pixel set defined by the defining mechanism in a predetermined manner. The second transforming mechanism transforms each of the input pixels stored in the input image data buffer into a transformed pixel which has an output pixel value out of m values representing m density levels according to an error diffusion method. The selecting mechanism selects one of resultant values of the first and second transforming mechanism in accordance with an original value of a presently processed input pixel-included in the input pixels stored in the input image data buffer.

BRIEF DESCRIPTION OF THE DRAWINGS

A more complete appreciation of the present invention and many of the attendant advantages thereof will be readily obtained as the same becomes better understood by reference to the following detailed description of preferred embodiments when considered in connection with the accompanying drawings, wherein:

FIG. 9 is an illustration for explaining an exemplary result of filtering input pixel values of neighboring pixels around the presently processed pixel with a Laplacian filter during the operation shown in FIG. 8;

FIG. 10 is an illustration for explaining exemplary threshold levels to generate three output levels;

FIGS. 12A and 12B are illustrations for explaining a way of reducing calculation loads by using a combination of regular-sized and reduced-sized error weighting masks.

DETAILED DESCRIPTION OF PREFERRED EMBODIMENTS

Figure 1:
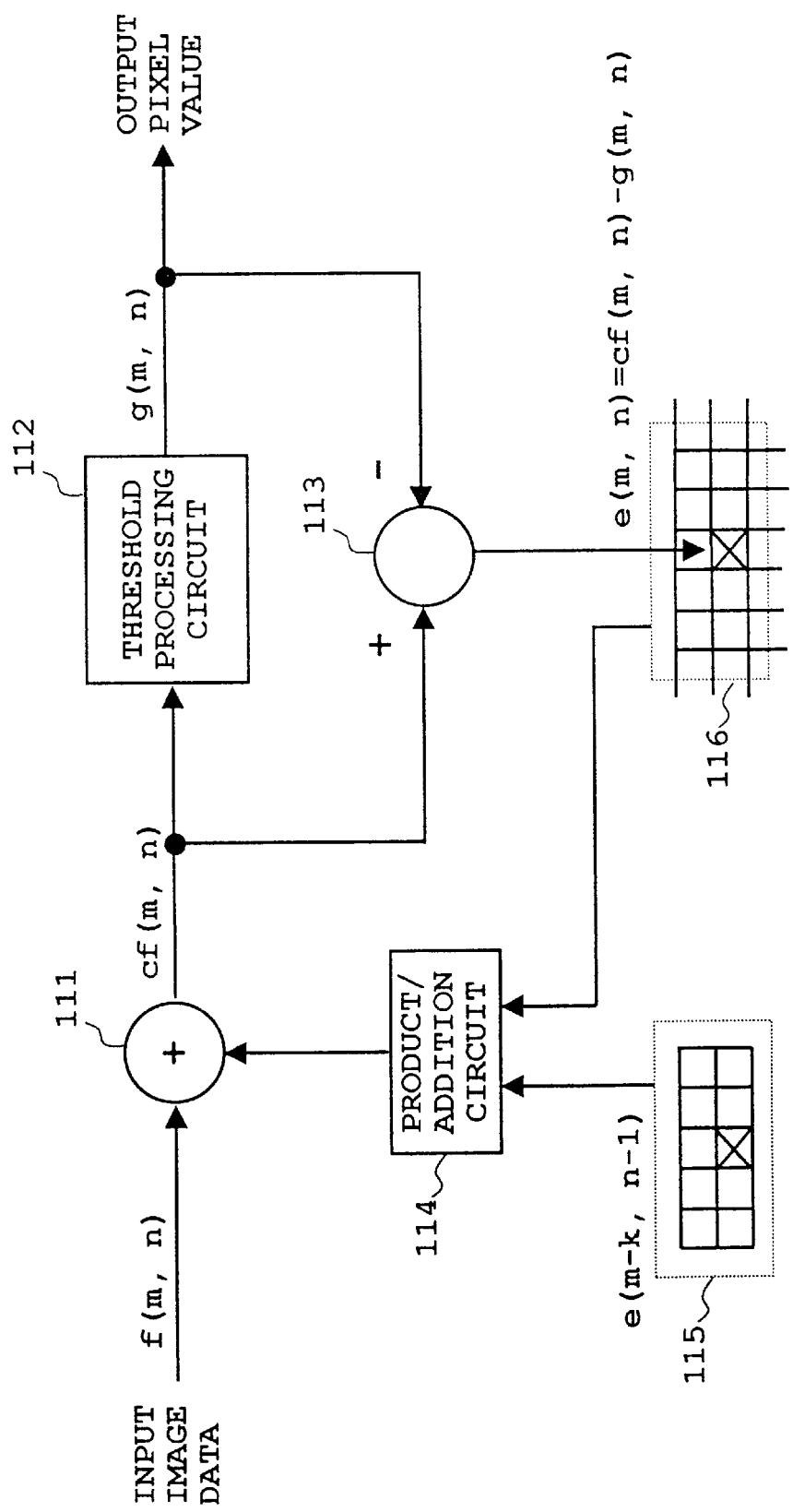
FIG. 1 is a block diagram of a related art error diffusion process.
Figure 2A:
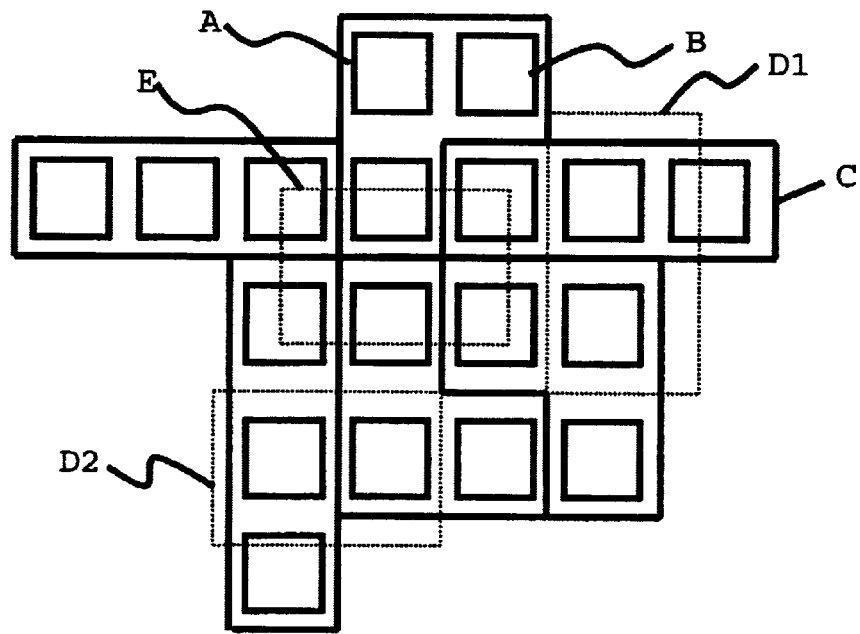
FIGS. 2A and 2B are illustrations for explaining drawbacks of the related art error diffusion process of FIG. 1.
Figure 2B:
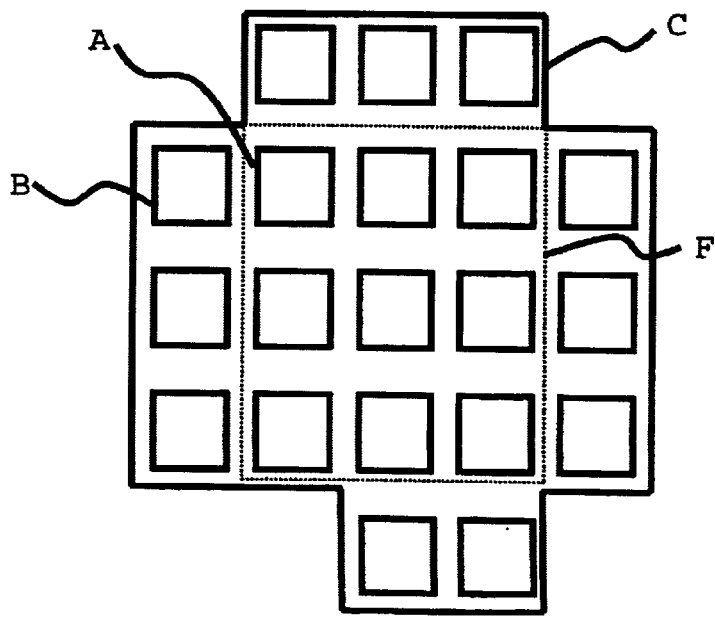

In describing preferred embodiments of the present invention illustrated in the drawings, specific terminology is used for the sake of clarity. However, the present invention is not intended to be limited to the specific terminology so selected and it is to be understood that each specific element includes all technical equivalents which operate in a similar manner.

Figure 3:
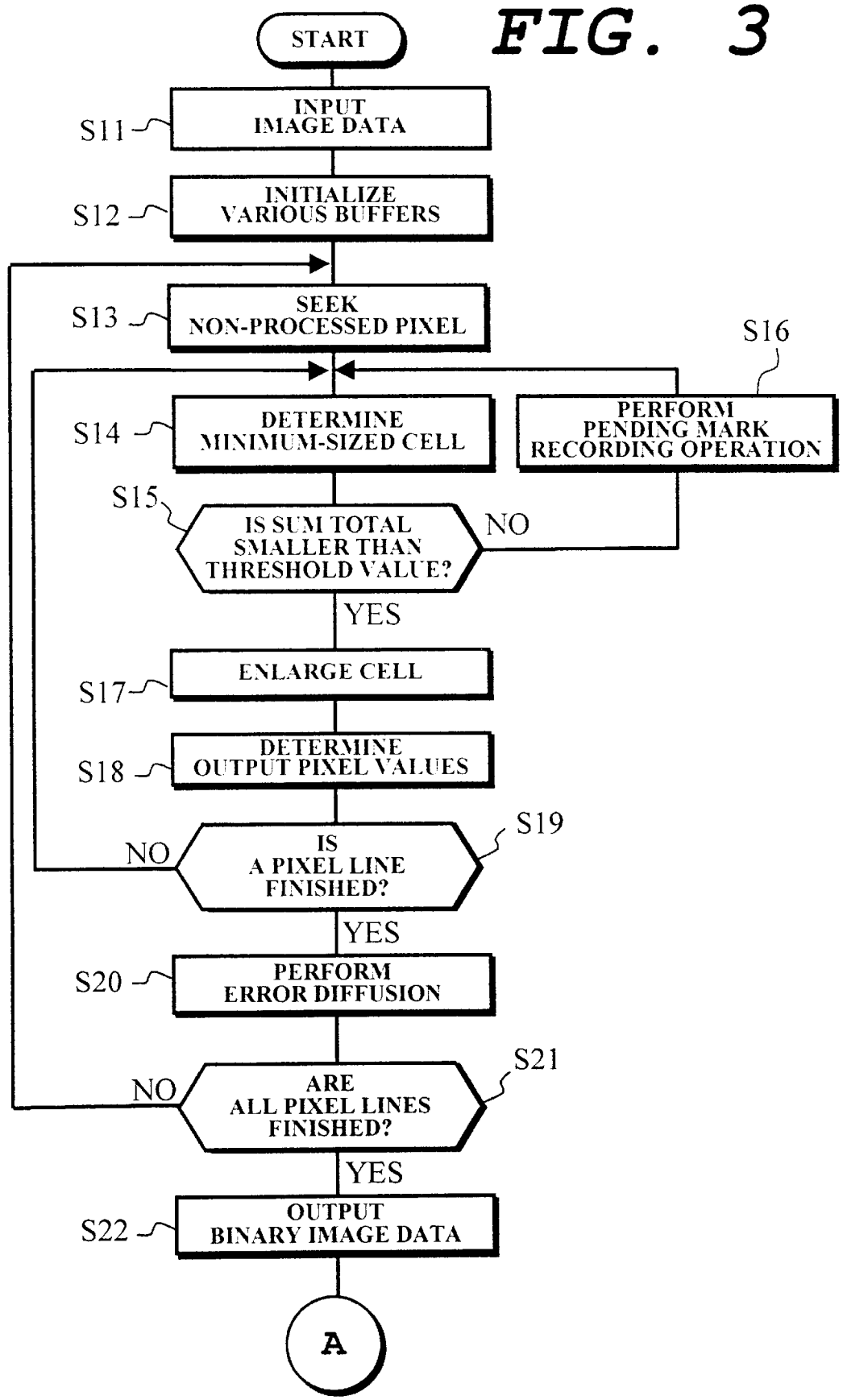
FIG. 3 is a flowchart for explaining a procedure of an exemplary operation of an image processing method according to a first preferred embodiment of the present invention.

Referring now to the drawings, wherein like reference numerals designate identical or corresponding parts throughout the several figures, and more particularly to FIG. 3 thereof, a flowchart for explaining an exemplary operation of an image processing method according to a first preferred embodiment of the present invention is illustrated.

In the procedure of this exemplary operation shown in FIG. 3, the processes of Steps S11 and S12 prepare image data that can be processed. More specifically, 8-bit input image data is input to an input image data buffer in Step S11 and various buffers provided for processing the image data are initialized to 0, in Step S12. These buffers preferably include an output image data buffer, a processed-pixel recording buffer, an adaptively-enlarged-cell error recording buffer, and an error-diffusion error recording buffer. Each of these buffers preferably have the same memory capacity as the input image data buffer.

Figure 5:
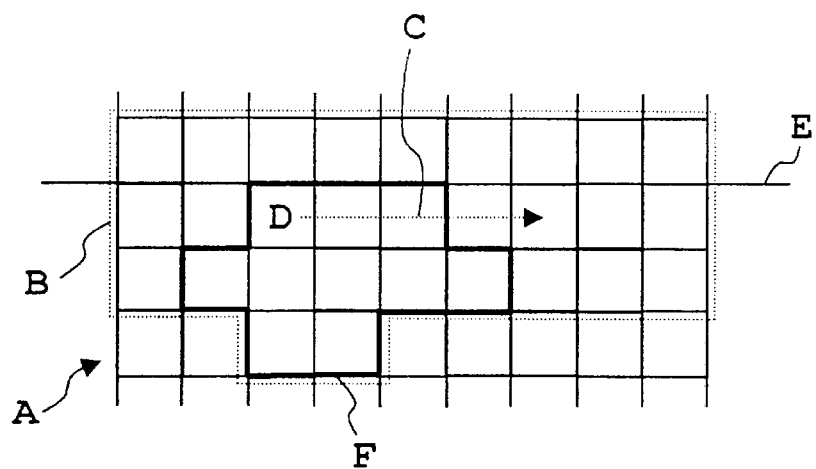
FIG. 5 is an illustration for explaining a process of establishing a cell in a cell enlargement mode during the operations shown in FIG. 3.

Then, the process of Step S13 specifies a starting pixel of a cell. In a pixel stream A of FIG. 5, a set of pixels indicated by dotted lines are referred to as a. processed-pixel set B and are stored in the processed-pixel recording buffer. The process of Step S13 scans each pixel in the processed-pixel set in the scanning direction C to search for a pixel that has not been processed (non-processed pixels) and that is set to 0. In FIG. 5, a pixel D is a non-processed pixel and is set to 0. Thereby, the process of Step S13 identifies the pixel D as a starting pixel of a cell. In FIG. 5, pixels in pixel lines above a line E have been processed (processed pixel) and pixels in a pixel line immediately below the line E are being processed.

Upon specifying the starting pixel D, the process of Step S14 adds a predetermined minimum number of pixels one by one to the starting pixel D so as to define, for example, a 10-pixel cell F, as indicated by thick lines in FIG. 5. Then, the process of Step S15 compares the sum total of the input pixel values at the respective pixel locations in the 10-pixel cell F, which is the minimum-sized cell, and the error values of corresponding locations in the adaptively-enlarged-cell error recording buffer with a predetermined threshold value. In the present preferred embodiment, the predetermined threshold value is preferably set to 256, for example.

When the comparison in Step S15 determines that the sum total is equal to or greater than 256, the cell F is defined as a part out of a highlight portion of the input image and the procedure proceeds to Step S16. The process of Step S16 performs a pending mark recording operation, provided that the error diffusion is selected to determine an output pixel value of the cell F during the cell processing method selection process. The pending mark recording operation makes an output pixel value of the cell F undetermined and writes a predetermined value (i.e., 2) at the locations in the processed-pixel recording buffer corresponding to the pixels of the cell F so as to indicate that the output pixel value of the cell F is not defined. Upon completing the pending mark recording operation in Step S16, the procedure returns Step S14 so as to search for the next cell. The purpose of this pending mark recording operation is to batch-process the output pixel values via error diffusion at a later time since the output pixel values are not determined during the time when a cell enlargement operation described below is being performed.

When the comparison in Step S15 determines that the sum total is smaller than 256, the cell F is defined as a part of a highlight portion of the input image. In this case, an output pixel value of the cell F is determined using an operation which adaptively enlarges the cell F in accordance with the conditions of the cell F associated with the input pixel values thereof. More specifically, the process of Step S17 adds to the cell F, non-processed pixels that are located around and adjacent to the cell F, one by one. This adding process is terminated when the sum total of the input pixel values at the respective pixel locations in the adaptively-enlarged cell F and the error values of corresponding locations in the adaptively-enlarged-cell error recording buffer becomes equal to or greater than 256. Subsequently, the process of Step S18 selects a pixel which is located closer to the. center of the cell F, and sets the selected pixel to 255 and sets pixels other than the selected pixels to 0.

Further, the process of Step S18 writes a predetermined value (i.e., 1) at the locations in the processed-pixel recording buffer corresponding to the pixels of the cell F to indicate that the output pixel value of the adaptively-enlarged cell F is defined. Then, the process of Step S18 subtracts the sum of the output pixel values (255) of the adaptively-enlarged cell F from the sum total of the input pixel values at the respective pixel locations in the adaptively-enlarged cell F and the error values of the adaptively-enlarged-cell error recording buffer. The resultant value of the subtraction is then written at the locations in the adaptively-enlarged-cell error recording buffer corresponding to the pixels of the adaptively-enlarged cell F.

Then, the process of Step S19 checks for an existence of a non-processed pixel in the pixel line currently being processed. By the time non-processed pixels are no longer found in the pixel line currently being processed, each of the pixels included in the previous pixel lines has been provided with a pixel value and an error-diffusion error value. Consequently, the pixels of the present pixel line are processed with the error diffusion in Step S20. At this time, the error-diffusion error recording buffer is used as an error buffer for the error diffusion.

In the processing operation in Step S20, the pixel line has a mixture of pixels that have undetermined output pixel values and pixels that have determined output pixel values. Consequently, these two different pixels are handled differently in the error diffusion processing according to the present preferred embodiment.

Figure 6:
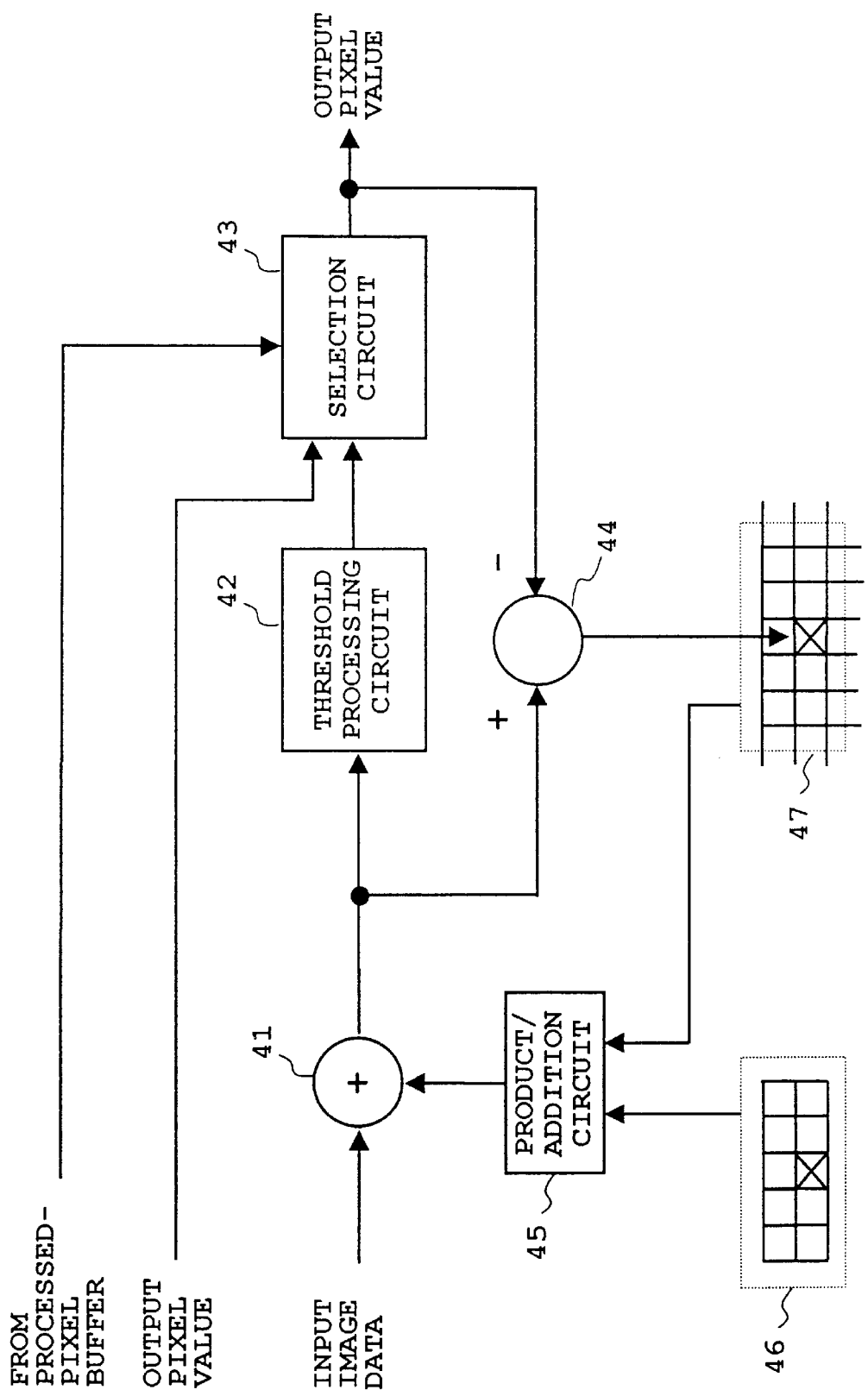
FIG. 6 is a block diagram of an image processing apparatus for performing the operations shown in FIG. 3.

FIG. 6 shows a block diagram of an exemplary circuit for performing the error diffusion processing. The circuit of FIG. 6 includes an adder 41, a threshold value processing circuit 42, a selection circuit 43, a subtracter 44, a product addition circuit 45, an error weighting circuit 46, and an error buffer memory 47. For both of the above-mentioned two different types of pixels, values are calculated through the adder 41, the threshold value processing circuit 42, the subtracter 44, the product addition circuit 45, the error weighting circuit 46, and the error buffer memory 47. Such calculation result determines output pixel values for the pixels that have the undetermined output pixel values. However, such calculation result does not determine output pixel values for the pixels that have the determined output pixel values. That is, in the case of the pixels that have the determined output pixel values, the determined output pixel values thereof are selected by the selection circuit 43 and are used for calculation to determine errors between the determined output pixel values and the errors from the weighted addition calculation via the above-described circuits..

Figure 7:
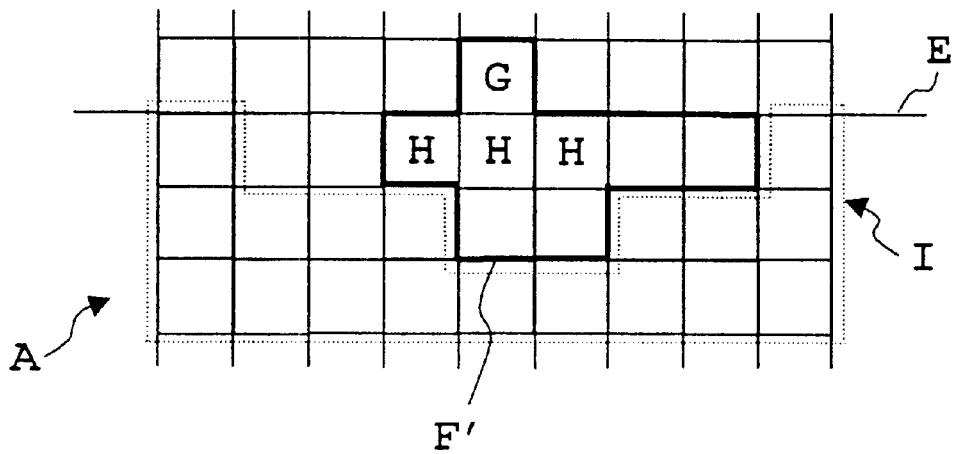
FIG. 7 is an illustration for explaining a process of performing an error diffusion during the operation shown in FIG. 3.

As a result of performing the two different operations according to the two different type of pixels as described above, error values will be made relatively smaller (great negative values) at the locations corresponding to the pixels of which output pixel values have been set to 255 through the processing of adaptively enlarging the cell F. Accordingly, as illustrated in FIG. 7, the results of error diffusion processing around an area where the above-mentioned two different pixels are mixed become 0. As a result, the problem of generating a series of pixels having a value of 0 or 255 around an area where the above-mentioned two different pixels are mixed, is effectively eliminated.

By the check process of Step S21, the error diffusion processing from the process of Step S13 to the process of Step S20 can be repeated until all the pixels in all the pixel lines have been processed. Upon a completion of such error diffusion processing, the process of Step S22 outputs binary-valued image data from the output image data buffer. In this way, the multi-valued digital image data is transformed into the binary-valued image data while eliminating the aforementioned problems experienced with the related methods.

The processed-pixel recording buffer, the adaptively-enlarged-cell error recording buffer, and the error-diffusion error recording buffer do not necessarily require the same memory capacity as the input image data buffer. Alternatively, these buffers are configured to have a memory capacity that sufficiently accommodates a predetermined volume of image data area where a pixel is searched by each scanning operation. In this case, addressing to these buffers is changed in a stepwise manner in accordance with the progress of the error diffusion operation along the input image data.

Figure 4:
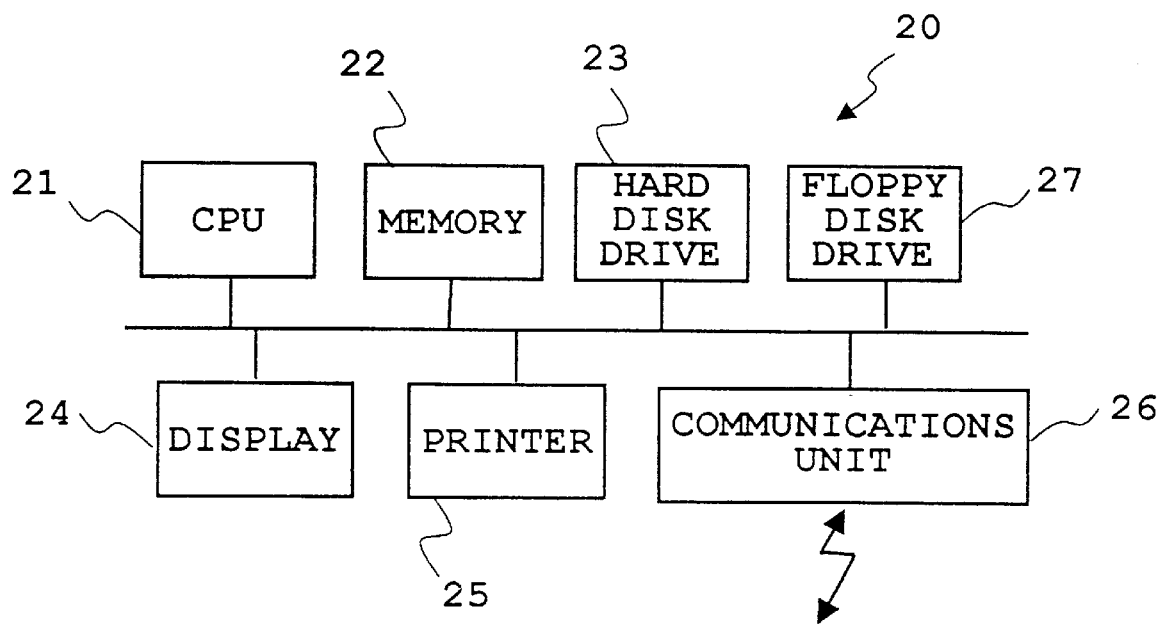
FIG. 4 is a block diagram of a computer system for performing the operations shown in FIG. 3.

The present invention can be implemented in an image processing program which can be operated on a general operating system 20 that includes at least, as shown in FIG. 4, a CPU (central processing unit) 21, a memory 22, a hard disk drive 23, a display unit 24, a printer 25, a communications unit 26, and a floppy disk drive 27.

Such an image processing program can be executed on the operating system 20 of FIG. 4 in the following manner.

The image processing program previously generated according to preferred embodiments of the present invention is input to the operating system 20 via an input device such as the communications unit 26, the floppy disk drive 27, or other similar device. Then, multi-valued digital image data to be processed is input to the operating system 20 via an input device such as the communications unit 26, the floppy disk drive 27, or other similar device.

Upon a completion of the input operations, the image processing program is executed using the CPU 21, the memory 22, the hard disk drive 23, and so on so as to perform the above-described binary-valued transformation. The resultant output pixel values are stored in the memory 22, and are then used in the following manner. The resultant pixel values can be output to an image output device such as the display unit 24, the printer 25, etc., or to outside of the operating system 20 via a data output device such as the communications unit 26, the floppy disk drive 27, etc., or to an external storage such as the hard disk drive 23, etc. so as to be stored therein.

Alternatively, the binary-valued transformation can be performed on a printer that includes a processor, a memory storing the image processing program, and another memory for storing data.

Next, an exemplary operation of an image processing method according to a second preferred embodiment of the present invention is explained with reference to FIGS. 8–10. In principle, the second preferred embodiment determines on a pixel-by-pixel basis whether to perform the error diffusion process and establishes a cell when the error diffusion is not performed, while the first preferred embodiment determines whether to perform the error diffusion on a cell-by-cell basis upon establishing each cell. The error diffusion is performed in the second preferred embodiment at a time either when a pixel has a relatively great value (a non-highlight portion) or when a pixel has a relatively great difference in values between adjacent pixels (an edge portion). Further, the error diffusion in the second preferred embodiment transforms an input image in 256 gray scales into that in 3 gray scales (0,128, 255), for example.

Figure 8:
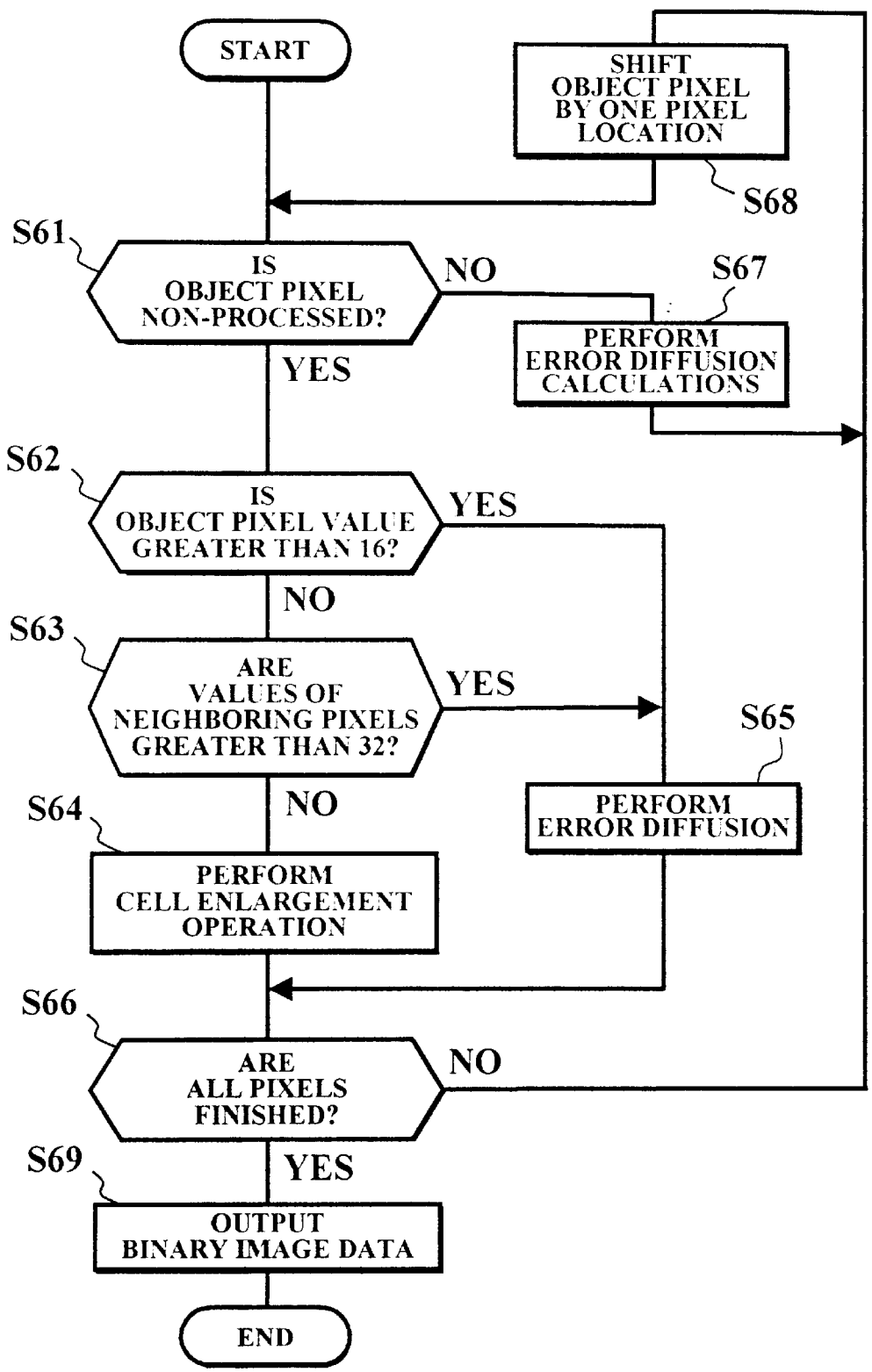
FIG. 8 is a flowchart for explaining a procedure of an exemplary operation of an image processing method according to a second preferred embodiment of the present invention.

The process of Step S61 in the flowchart of FIG. 8 reads a value at a location in the processed-pixel recording buffer corresponding to an object pixel to be processed and checks if the read value is equal to 1 which indicates that the object pixel is a processed pixel. If the read value is equal to 1, the procedure proceeds to Step S67. The process of Step S67 seeks a weighted mean value of errors while adding the adjacent pixels, and obtains an error between the weighted mean value and the determined output image value. The process of Step S67 then writes the obtained error in the error-diffusion error recording buffer. This portion of the process of the Step S67 is performed in a manner similar to that for the aforementioned first preferred embodiment. Subsequently, the process of Step S68 shifts from the current pixel to the next pixel. If the read value is equal to 0 which indicates that the next pixel is a non-processed pixel, the procedure proceeds to Step S62.

Then, the process of Step S62 reads an input pixel value at a location of the object pixel to be processed from the input image data buffer, and compares the read input pixel value with a first threshold value which is set to 16, for example. If the read input pixel value is greater than 16, the procedure proceeds to Step S65 where the error diffusion is performed. If the read input pixel value is smaller than 16, the procedure proceeds to Step S63 where a value related to the adjacent pixel is compared with a second threshold value which is set to 32, for example. In this case, the input pixel value of the adjacent pixel relative to the object pixel is filtered with a Laplacian filter having a differential coefficient such that a Laplacian second-order differential operation results in the values as shown in FIG. 9. An absolute value of such result is used to compare with the second threshold value in the above-mentioned process of Step S63. If this absolute value is greater than 32, the procedure proceeds to Step S65 where the error diffusion is performed.

With this procedure from Step S63 to Step S64, the error diffusion is performed on an image portion where density varies greatly, thereby resulting in a relatively high resolution binary-valued image.

If this absolute value is smaller than 32, the procedure proceeds to Step S64 where the operation of adaptively enlarging the cell is performed starting from the object pixel, in a manner similar to that for the first preferred embodiment. In this case, the process of Step S64 enlarges the cell until the sum total of the input pixel value exceeds 128, and selects a pixel which is located at the center of the cell to set the selected pixel to 128. After that, the process of Step S64 writes a value 128 at the locations in the processed-pixel recording buffer and the adaptive-cell error recording buffer corresponding to the location of the object pixel.

In the process of Step S65, the error diffusion is performed in a manner similar to that for the aforementioned first preferred embodiment, except for the threshold processing which uses two thresholds (85 and 170) for generating a triple-valued output (0, 128, and 255), as illustrated in FIG. 10. Then, the check process of Step S66 checks if all the pixels have been processed. By this check process, the error diffusion processing from the process of Step S61 to the process of Step S68 can be repeated until all of the pixels in all of the pixel lines have been processed. Upon a completion of such an error diffusion processing, the process of Step S69 outputs triple-valued image data from the output image data buffer. In this way, the triple-valued digital image data is transformed into the binary-valued image data while effectively eliminating the problems with the related methods described above.

As described above, each of the image processing methods according to the first and second preferred embodiments performs error diffusion on every pixel and, in addition, performs the cell enlargement operations. Therefore, each method requires a complex operation which accordingly requires a relatively long time to perform in comparison with the related art error diffusion process.

Figure 11:
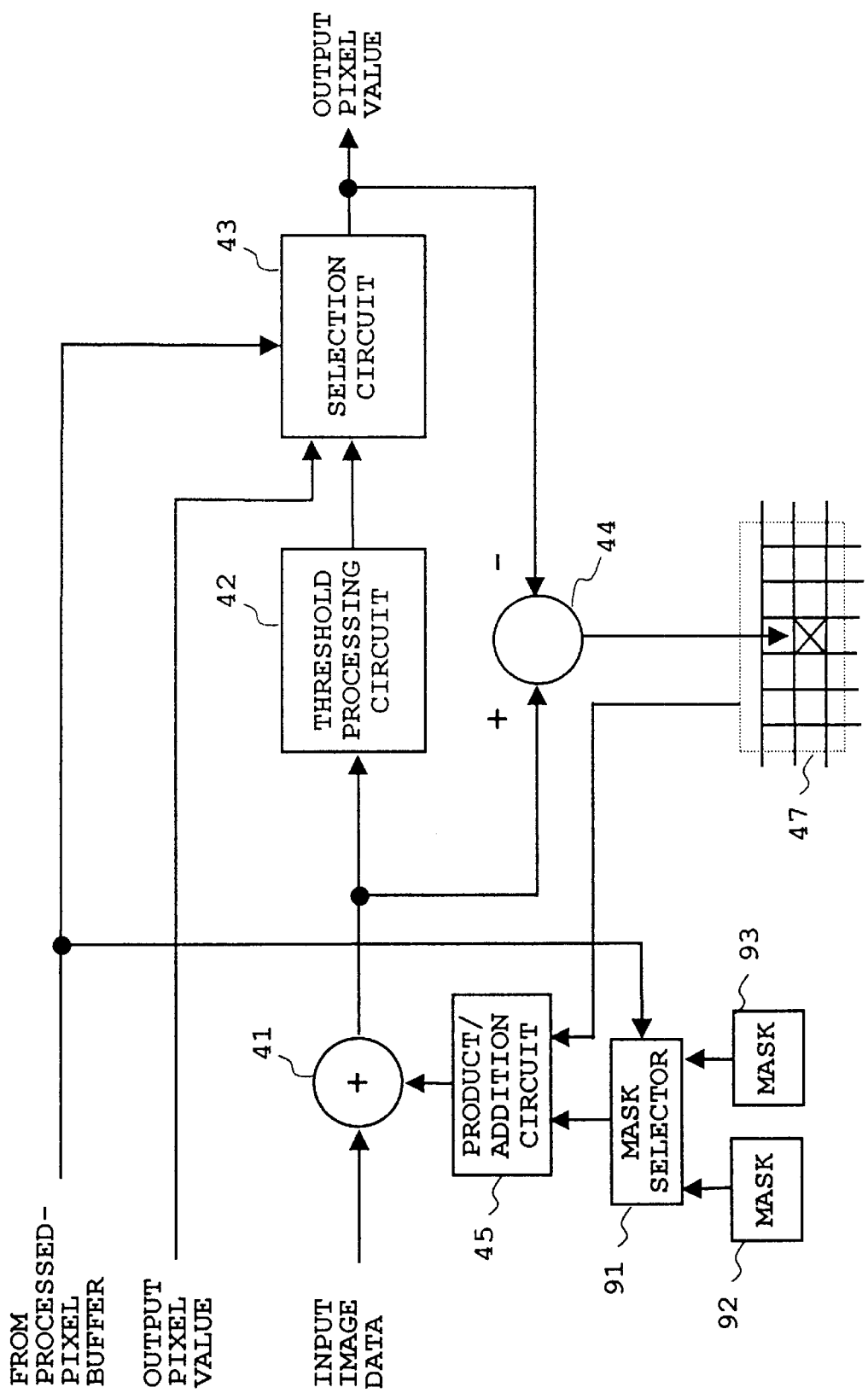
FIG. 11 is a block diagram of an image processing apparatus for performing the operation shown in FIG. 8.

Next, an exemplary operation of an image processing method according to a third preferred embodiment of the present invention is explained with reference to FIGS. 11 and 12. The third preferred embodiment improves the processing speed by simplifying the error diffusion on the cells which have been processed through the cell enlargement operation.

In the operations executed by the error diffusion process, the calculations for summing weighted error values using an error weighting mask require a relatively large portion thereof. The error weighting mask used for the non-processed pixels is an important parameter to determine a quality of the resultant texture, as in the related art error diffusion process. The sum of the weighted error values of the processed pixels, however, is relatively less important since it is used merely for maintaining consistency of a value around an area where the cell enlargement operation and the error diffusion are alternately used, as described above. Therefore, in the case of processed pixels, the calculations for summing the weighted error values can be performed at a reduced number of locations of the pixels without causing a serious problem in quality of the resultant texture.

The image processing method according to the third preferred embodiment is similar to that according to the first preferred embodiment, except for a portion of the line-by-line operation in the error diffusion. Specifically, the error diffusion according to the third preferred embodiment provides a mask selector 91 and error weighting masks 92 and 93, as shown in FIG. 11, for performing the calculations for summing the errors of the pixels adjacent to the current object pixel. One of these error weighting masks 92 and 93 is configured to be have a reduced size, as illustrated in FIG. 12A, so as to reduce the load of the calculations. The other one of the error weighting masks 92 and 93 has a relatively greater size as illustrated in FIG. 12B.

The process of the error diffusion according to the third preferred embodiment reads a value at the location of the object pixel in the processed-pixel recording buffer so as to check if the object pixel is a processed pixel. If the object pixel is determined to be a processed pixel, the error weighting mask shown in FIG. 12A is selected by the mask selector 91, and if the object pixel is determined to be a non-processed pixel, the error weighting mask shown in FIG. 12B is selected by the mask selector 91.

In this way, the image processing method according to the third preferred embodiment uses an additional error weighting mask which has a reduced size so as to reduce the calculation time and operations required for summing the weighted error values without causing a serious problem with quality of the resultant texture.

Alternatively, the image processing method according to preferred embodiments of the present invention can reduce the calculation time and operations by assigning 1 to every weight factor.

Also, the image processing method according to preferred embodiments of the present invention can alternatively reduce the calculation time and operations by changing the product operation to a shift operation using the $n^{th}$ power of 2.

Preferred embodiments of the present invention also provide a computer program product which is a storage medium including instructions which can be used to program a computer to perform a process of other preferred embodiments of the present invention. The storage medium can include, but is not limited to, any type of disk including floppy disks, optical disks, CD-ROMs, and magneto-optical disks, ROMs, RAMs, EPROMs, EEPROMs, magnet or optical cards, or any type of media suitable for storing electronic instructions.

This invention may be conveniently implemented using a conventional general purpose digital computer programmed according to the teachings and preferred embodiments of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

This document claims the priority rights of and is based on the subject matter described in Japanese patent application No. JPAP10-191277 filed on Jul. 7, 1998, in the Japanese Patent Office, the entire contents of Which are hereby incorporated by reference.

What is claimed is:

1. A method for image processing, comprising the steps of:

inputting n-step gray tone image data including a plurality of input pixels into an input image data buffer, each input pixel having an original value equal to one of n values representing n density levels, wherein n is a positive whole number;

a first transforming step for transforming each of said input pixels stored in said input image data buffer into a transformed pixel having an output pixel value equal to one of m values representing m density levels, wherein m is a positive whole number and smaller than n, said first transforming step including the steps of:

defining a pixel set including a plurality of non-processed pixels adjacent to each other in a processed-pixel recording buffer in accordance with a sum total of the original values of input pixels stored in said input image data buffer at locations corresponding to said plurality of non-processed pixels to be defined as a pixel set; and determining output pixel values from the m values in accordance with a sum total of the original values of input pixels stored in said input image data buffer at locations corresponding to a plurality of non-processed pixels of said pixel set defined by said defining step, each of said determined output pixel values being assigned to each non-processed pixel included in the pixel set defined by said defining step;

a second transforming step for transforming each of said input pixels stored in said input image data buffer into a transformed pixel having an output pixel value equal to one of m values representing m density levels according to an error diffusion method; and selecting one of resultant values produced by said first and second transforming steps in accordance with an original value of an input pixel currently being processed and included in said input pixels stored in said input image data buffer.

2. The image processing method as defined in claim 1, wherein said selecting step selects the resultant value of said second transforming step when said sum total of the original values of pixels in said input image data buffer at the locations corresponding to said plurality of non-processed pixels included in the pixel set defined in said defining step is within a first predetermined range.

3. The image processing method as defined in claim 1, wherein said selecting step selects the resultant value of said first transforming step when said original value of said presently processed input pixel included in said input pixels stored in said input image data buffer is within a predetermined range.

4. The image processing method as defined in claim 1, wherein said first transforming step includes a correction step for correcting said original value of said presently processed input pixel with error values pertinent to adjacent pixels located around said currently processed input pixel, and said second transforming step includes. a calculation step for calculating a difference between the resultant value produced by said first transforming step and said original value corrected by said correction step when said selecting step selects said resultant value of said first transforming step and records said difference as an error.

5. The image processing method as defined in claim 1 wherein said second transforming step shifts the input pixel currently being processed to a different pixel in accordance with whether the input pixel currently being processed has been assigned an output pixel value, and performs a product and addition operation relative to said different pixel.

6. The image processing method as defined in claim 1, wherein said second transforming step changes an error weighting mask currently being used to a different mask in accordance with whether the input pixel currently being processed has been assigned an output pixel value, and performs a product and addition operation using said different mask.

7. A storage media which stores a computer program therein, said computer program being executable to perform the steps of:
    inputting n-step gray tone image data including a plurality of input pixels into an input image data buffer, each input pixel having an original value equal to one of n values representing n density levels, wherein n is a positive whole number;
    a first transforming step for transforming each of said input pixels stored in said input image data buffer into a transformed pixel having an output pixel value equal to one of m values representing m density levels, wherein m is a positive whole number and smaller than n, said first transforming step including:
        defining a pixel set including a plurality of non-processed pixels located adjacent to each other in a processed-pixel recording buffer in accordance with a sum total of the original values of input pixels stored in said input image data buffer at locations corresponding to said plurality of nonprocessed pixels to be defined as a pixel set; and
        determining output pixel values from m values in accordance with a sum total of the original values of input pixels stored in said input image data buffer at locations corresponding to a plurality of non-processed pixels of said pixel set defined by said defining step, each of said determined output pixel values being assigned to each non-processed pixel included in the pixel set defined by said defining step;
    a second transforming step for transforming each of said input pixels stored in said input image data buffer into a transformed pixel having an output pixel value equal to one of m values representing m density levels according to an error diffusion method; and
    selecting one of the resultant values produced by said first and second transforming steps in accordance with an original value of a currently processed input pixel included in said input pixels stored in said input image data buffer.

8. A storage media as defined in claim 7, wherein said selecting step selects the resultant value of said second transforming step when said sum total of the original values of pixels in said input image data buffer at the locations corresponding to said plurality of non-processed pixels included in the pixel set defined in said defining step is within a first predetermined range.

9. A storage media as defined in claim 7, wherein said selecting step selects the resultant value of said first transforming step when said original value of said presently processed input pixel included in said input pixels stored in said input image data buffer is within a predetermined range.

10. A storage media as defined in claim 7, wherein said first transforming step includes a correction step for correcting said original value of said presently processed input pixel with error values pertinent to adjacent pixels located around said currently processed input pixel, and said second transforming step includes a calculation step for calculating a difference between the resultant value produced by said first transforming step and said original value corrected by said correction step when said selecting step selects said resultant value of said first transforming step and records said difference as an error.

11. A storage media as defined in claim 7, wherein said second transforming step shifts the input pixel currently being processed to a different pixel in accordance with whether the input pixel currently being processed has been assigned an output pixel value, and performs a product and addition operation relative to said different pixel.

12. A storage media as defined in claim 7, wherein said second transforming step changes an error weighting mask currently being used to a different mask in accordance with whether the input pixel currently being processed has been assigned an output pixel value, and performs a product and addition operation using said different mask.

13. An image processing apparatus, comprising:
    a data input arranged to input n-step gray tone digital image data including a plurality of input pixels into an input image data buffer, each input pixel having an original value equal to one of n values representing n density levels, wherein n is a positive whole number;
    a first transformer arranged to change each of said input pixels stored in said input image data buffer into a transformed pixel having an output pixel value out of m values representing m density levels, wherein m is a positive whole number and smaller than n, said first transformer including:
        a defining unit arranged to define a pixel set including a plurality of non-processed pixels located adjacent to each other in a processed-pixel recording buffer in accordance with a sum total of the original values of input pixels stored in said input image data buffer at locations corresponding to said plurality of non-processed pixels to be defined as a pixel set; and
        a determining unit arranged to determine output pixel values from m values in accordance with a sum total of the original values of input pixels stored in said input image data buffer at locations corresponding to a plurality of non-processed pixels of said pixel set defined by said defining unit, each of said determined output pixel values being assigned to each non-processed pixel included in the pixel set defined by said defining unit;
    a second transformer arranged to change each of said input pixels stored in said input image data buffer into a transformed pixel having an output pixel value equal to one of m values representing m density levels according to an error diffusion method; and
    a selector arranged to select one of the values produced by said first and second transformers in accordance with an original value of an input pixel currently being processed and included in said input pixels stored in said input image data buffer.

14. The image processing apparatus as defined in claim 13, wherein said selector selects,the resultant value of said second transformer when said sum total of the original values of pixels in said input image data buffer at the locations corresponding to said plurality of non-processed pixels included in the pixel set defined by said defining unit is within a first predetermined range.

15. The image processing apparatus as defined in claim 13, wherein said selector selects the resultant value of said first transformer when said original value of said currently processed input pixel included in said input pixels stored in said input image data buffer is within a predetermined range.

16. The image processing apparatus as defined in claim 13, wherein said first transformer includes a correction unit arranged to correct said original value of said currently processed input pixel with error values relating to adjacent pixels located around said currently processed input pixel.

17. The image processing apparatus as defined in claim 16, wherein said second transformer includes a calculator arranged to calculate a difference between the resultant value output by said first transformer and said original value corrected by said correction unit when said selector selects said resultant value of said first transformer and records said difference as an error.

18. The image processing apparatus as defined in claim 13, wherein said second transformer shifts the currently processed input pixel to a different pixel according whether the currently processed input pixel has been assigned an output pixel value, and performs a product and addition operation relative to said different pixel.

19. The image processing apparatus as defined in claim 13, wherein said second transformer changes a currently used error weighting mask to a different mask according to whether the presently processed input pixel has been assigned an output pixel value, and performs a product and addition operation using said different mask.

* * * * *